(12) United States Patent
Boffa et al.

(10) Patent No.: US 7,981,846 B2
(45) Date of Patent: Jul. 19, 2011

(54) LUBRICATING OIL COMPOSITION WITH IMPROVED EMISSION COMPATIBILITY

(75) Inventors: Alexander B. Boffa, San Francisco, CA (US); Ralph Eric Olsen, San Rafael, CA (US); Willem Van Dam, Novato, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 750 days.

(21) Appl. No.: 11/292,403

(22) Filed: Nov. 30, 2005

(65) Prior Publication Data
US 2007/0123437 A1 May 31, 2007

(51) Int. Cl.
C10M 111/04 (2006.01)
C10M 163/00 (2006.01)
C10L 1/22 (2006.01)

(52) U.S. Cl. .................. 508/192; 508/155; 508/186

(58) Field of Classification Search .......... 508/192, 508/155, 186
See application file for complete search history.

(56) References Cited

U.S. PATENT DOCUMENTS

| | | |
|---|---|---|
| 2,174,110 A | 9/1939 | Reed |
| 2,202,781 A | 5/1940 | Kennedy |
| 2,239,974 A | 4/1941 | Reed |
| 2,319,121 A | 5/1943 | Fox |
| 2,337,552 A | 12/1943 | Henke |
| 2,346,156 A | 4/1944 | Farrington et al. |
| 2,616,904 A | 11/1952 | Asseff et al. |
| 2,616,905 A | 11/1952 | Asseff et al. |
| 2,616,906 A | 11/1952 | Asseff et al. |
| 2,987,476 A | 6/1961 | Hartley et al. |
| 3,172,892 A | 3/1965 | Le Suer et al. |
| 3,219,666 A | 11/1965 | Norman et al. |
| 3,242,080 A | 3/1966 | Wiley et al. |
| 3,250,710 A | 5/1966 | Hunt |
| 3,256,186 A | 6/1966 | Greenwald |
| 3,272,746 A | 9/1966 | Le Suer et al. |
| 3,274,135 A | 9/1966 | Norman et al. |
| 3,368,972 A | 2/1968 | Otto |
| 3,480,548 A | 11/1969 | Hellmuth et al. |
| 3,488,284 A | 1/1970 | Le Suer et al. |
| 3,492,231 A | 1/1970 | McMillen |
| 3,539,663 A | 11/1970 | Pietrusza et al. |
| 3,574,576 A | 4/1971 | Honnen et al. |
| 3,595,790 A | 7/1971 | Norman et al. |
| 3,649,229 A | 3/1972 | Otto |
| 3,798,012 A | 3/1974 | Le Suer |
| 3,909,430 A | 9/1975 | Hotten |
| 3,929,650 A | 12/1975 | King et al. |
| 3,968,157 A | 7/1976 | Hotten |
| 4,157,309 A | 6/1979 | Wilgus et al. |
| 4,230,586 A | 10/1980 | Bretz et al. |
| 4,259,194 A | 3/1981 | deVries et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | deVries et al. |
| 4,272,387 A | 6/1981 | King et al. |
| 4,283,295 A | 8/1981 | deVries et al. |
| 4,285,822 A | 8/1981 | deVries et al. |
| 4,369,119 A | 1/1983 | deVries et al. |
| 4,370,246 A | 1/1983 | deVries et al. |
| 4,394,279 A | 7/1983 | deVries et al. |
| 4,402,840 A | 9/1983 | deVries et al. |
| 4,683,126 A * | 7/1987 | Inoue et al. ............ 423/280 |
| 4,792,410 A | 12/1988 | Schwind et al. |
| 4,965,003 A * | 10/1990 | Schlicht ................ 508/186 |
| 5,346,636 A | 9/1994 | Parc et al. |
| 5,854,182 A | 12/1998 | Swami et al. |
| 6,008,165 A | 12/1999 | Shanklin et al. |
| 6,156,850 A | 12/2000 | Harrison et al. |
| 6,605,572 B2 | 8/2003 | Carrick et al. |
| 6,632,781 B2 | 10/2003 | Harrison et al. |
| 2003/0096716 A1* | 5/2003 | Locke et al. .......... 508/525 |
| 2004/0204325 A1 | 10/2004 | Takahashi |
| 2004/0235682 A1* | 11/2004 | Van Dam et al. ........ 508/192 |

FOREIGN PATENT DOCUMENTS

| | | |
|---|---|---|
| EP | 1454977 | 8/2004 |
| EP | 1 479 752 | 11/2004 |
| WO | WO 03/104620 A2 | 12/2003 |

OTHER PUBLICATIONS

International Search Report issued in counterpart Singapore Patent Application No. 200809188-6.
International Search Report issued in counterpart European Patent Application No. 06 25 5481, Oct. 2010.

* cited by examiner

*Primary Examiner* — Walter D Griffin
*Assistant Examiner* — Frank C Campanell
(74) *Attorney, Agent, or Firm* — Josetta I. Jones; Michael Carmen

(57) ABSTRACT

A lubricating oil composition comprising a major amount of an oil of lubricating viscosity, an alkaline earth metal borated sulfonate detergent, and, optionally, a molybdenum-containing compound, wherein the lubricating oil composition comprises no more than 0.12 wt % phosphorus and the amount of sulfated ash in the lubricating oil is not more than 1.25 wt %.

54 Claims, No Drawings

US 7,981,846 B2

LUBRICATING OIL COMPOSITION WITH IMPROVED EMISSION COMPATIBILITY

FIELD OF THE INVENTION

The present invention is directed to an improved lubricating oil composition that may be used in engine oils, especially heavy duty diesel engines; and a process for preparing the same.

BACKGROUND OF THE INVENTION

Emissions arising from automotive exhaust have been a problem for several decades and approaches for addressing this problem have included the use of unleaded fuel (i.e., to control lead emissions arising from leaded fuels), oxygenated fuel (i.e., to reduce hydrocarbon emissions), and catalytic converters (i.e., to reduce hydrocarbon emissions).

Catalytic converters are now universally employed with gasoline and diesel powered vehicles and the efficiency of these converters is directly related to the ability of the catalyst to effectively convert un-burnt or partially burnt hydrocarbons generated during combustion to carbon dioxide and water. One problem arising with the use of such converters is poisoning of the catalyst, which results in reduced catalyst efficiency. Since catalytic converters are intended for extended use, catalyst poisoning results in higher levels of atmospheric discharges of pollutants from internal combustion engines over prolonged periods of time.

In order to minimize such poisoning, the automobile and truck industry has set standards for the concentrations of additives in both fuels and lubricants. With regard to the lubricants, one additive family currently addressed by industry standards is the phosphorus-containing additive family used in lubricant compositions employed to lubricate internal combustion engines. Specifically, phosphorus-containing additives reach the catalytic converter as a result of, for example, exhaust gas recirculation and/or blow-by processes as well as other methods that are well known in the art. In any event, phosphorus is known to accumulate in the catalytic converter and at active metal sites, thus reducing catalyst efficiency and effectively, over time, poisoning the catalyst and increasing hydrocarbon emissions. As a result of the above, the American Society for Testing and Materials (ASTM) has proposed new specifications (PC-10) that set the limitations of sulfated ash (no more than 1.0 wt %), phosphorus (no more than 0.12 wt %) and sulfur (no more than 0.4 wt %) in a heavy duty diesel engine oil.

A problem arises when the level of phosphorus is reduced in a lubricating oil composition containing an oil-soluble, phosphorus-containing, antiwear compound in that there is a significant reduction in anti-wear, anti-oxidation, and anti-corrosion performance arising from the decrease in the concentration of phosphorus in the engine oil.

This invention is directed to the discovery that heavy duty diesel engine oils comprising a major amount of an oil of lubricating viscosity and a borated alkaline earth metal sulfonate detergent, wherein the engine oil contains no more than 0.12 wt % phosphorus and no more than 1.25 wt % sulfated ash, reduces corrosion and decreases catalyst poisoning. This present invention meets the ASTM specifications for phosphorus, decreases hydrocarbon emissions and controls bearing lead corrosion.

BACKGROUND ART

Parc et al., U.S. Pat. No. 5,346,636 discloses a colloidal product that contains boron and phosphorous. The colloidal product is obtained by the following process: obtaining an alkali metal sulfonate or borated alkaline-earth sulfonate; reacting said borated overbased sulfonate with at least one phosphorous sulfide; and separating the product obtained. Example 10 of this reference discloses a lubricating oil composition which has a concentration of calcium, phosphorous, boron and sulfur. This reference also discloses the addition of other additives, such as anti-oxidants, to the lubricating oil.

Shanklin et al., U.S. Pat. No. 6,008,165 discloses a lubricating oil composition that contains a borated dispersant, a metal salt of a phosphorous acid, a metal overbased composition comprising at least one carboxylate, phenate or sulfonate wherein the metal is lithium, sodium, potassium, magnesium or calcium, and wherein the improvement comprises a borate ester.

Hellmuth et al., U.S. Pat. No. 3,480,548 discloses a lubricating oil composition prepared by reacting a lubricating oil dispersion of an alkaline earth metal carbonate and alkaline earth metal hydrocarbon sulfonate with a boron compound selected from the group consisting of boric acids, boron oxides, and aqueous alkyl esters of boric acids.

King et al., U.S. Pat. No. 3,929,650 discloses a particulate dispersion of an alkali metal borate prepared by contacting boric acid with an alkali metal carbonate overbased metal sulfonate within an oleophilic liquid reaction medium. The patent also discloses the dispersion with other additives, such as antioxidants.

Carrick et al., U.S. Pat. No. 6,605,572 discloses a lubricating oil composition that contains a boron containing compound, wherein the lubricating oil composition contains 0.01-0.25 wt % of sulfur, 0.08 wt % or less of phosphorus.

SUMMARY OF THE INVENTION

Accordingly, in its broadest embodiment, the present invention is directed to a lubricating oil composition comprising:
(A) a major amount of an oil of lubricating viscosity; and
a borated alkaline earth metal sulfonate detergent prepared by a process comprising:
  (a) reacting
    (i) at least one of an oil soluble sulfonic acid, an alkaline earth sulfonate salt, or a mixtures thereof;
    (ii) at least one source of alkaline earth metal;
    (iii) at least one source of boron, in the presence of a mixture comprising:
      (1) at least one hydrocarbon solvent; and
      (2) from 0 to less than 10 mole percent, relative to the source of boron, of an overbasing acid, other than the source of boron; and
  (b) heating the reaction product of (a) to a temperature that is above the distillation temperature of (1) to distill (1) and the water generated in the reaction, wherein the lubricating oil composition comprises no more than 0.12 wt % phosphorus and no more than 1.25 wt % sulfated ash.

In another embodiment, the present invention is directed to a method of making a lubricating oil composition comprising:
mixing
  (A) a major amount of an oil of lubricating viscosity; and
  (B) a borated alkaline earth metal sulfonate detergent prepared by a process comprising:
    (a) reacting
      (i) at least one of an oil soluble sulfonic acid, an alkaline earth sulfonate salt, or a mixtures thereof;

(ii) at least one source of alkaline earth metal;
(iii) at least one source of boron, in the presence of
(1) at least one hydrocarbon solvent; and
(2) from 0 to less than 10 mole percent, relative to the source of boron, of an overbasing acid, other than the source of boron; and
(b) heating the reaction product of (a) to a temperature above the distillation temperature of (1) to distill (1) and water generated in the reaction, wherein the lubricating oil composition comprises no more than 0.12 wt % phosphorus and no more than 1.25 wt % sulfated ash.

It is therefore an object of the invention to provide an improved anti-wear, anti-oxidant, and anti-corrosion additive composition to be used in an oil of lubricating viscosity, which has the added advantage of low lead corrosion. The inventors have also found that there is an advantage in separating the source of boron when formulating the lubricating oil composition of the present invention. In particular, one has more flexibility in formulating with the amount of boron that is added to the lubricating oil composition of the present invention. Another additional feature of the present invention is that the use of the borated sulfonates described herein in the lubricating oil compositions may result in improved pour point as compared to other detergents.

DETAILED DESCRIPTION OF THE INVENTION

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DEFINITIONS

The following terms used within the description are defined as such:

The term "oil-soluble wear reducing phosphorous containing component (s)" refers to additives in lubricant compositions that contain phosphorous and which exhibit an anti-wear, anti-oxidant, and anti-corrosion benefit, either alone or when used in combination with other additives that are present in lubricating oils, such as, but not limited to, manual transmission fluids, automatic transmission fluids, continuously variable transmission fluids, hydraulic pump fluids, engine oils and gear oils.

The term "total phosphorous" refers to the total amount of phosphorous in the lubricant composition regardless of whether such phosphorous is present as part of an oil-soluble wear reducing phosphorous containing component or in the form of a contaminant in the lubricant composition such as residual phosphorous. The amount of phosphorous in the lubricating oil composition is independent of source.

The term "overbased detergent" refers to a composition comprising a small amount of diluent (e.g., lubricating oil) and a detergent complex wherein additional alkalinity is provided by a stoichiometric excess of a metal base, based on the amount required to react with the acidic moiety of the detergent.

The term "Total Base Number" or "TBN" refers to the amount of base equivalent to milligrams of KOH in 1 gram of sample. Thus, higher TBN numbers reflect more alkaline products and therefore a greater alkalinity reserve. For the purposes of this invention, TBN is determined by ASTM Test No. D2896.

Each and every numerical range and/or value, regardless whether it appears immediately or closely following the term "about," should be understood to encompass those variations that may represent the range of experimental error at occurs in any measurement.

It has been discovered that the lubricating oil composition of the present invention controls bearing lead corrosion and wear while reducing hydrocarbon emissions. The lubricating oil composition of the present invention comprises a major amount of an oil of lubricating viscosity, a borated alkaline earth metal sulfonate detergent, and, optionally, a molybdenum containing antioxidant, wherein the amount of phosphorus in the lubricating oil composition is no more than 0.12 wt % and the amount of sulfated ash is no more than 1.25 wt %. Preferably, the lubricating oil composition is used in a heavy duty diesel engine.

Borated Alkaline Earth Metal Sulfonate

The first aspect of the present invention involves adding a borated alkaline earth metal sulfonate to a heavy duty diesel engine oil. Preferably, the sulfonate is a calcium sulfonate or a magnesium sulfonate having a TBN of from about 10 to about 500. More preferred the TBN is from about 10 to about 400. Even more preferred 100 to 300. Most preferred 150 to 250.

The borated alkaline earth metal sulfonate is prepared in the following manner:
(a) Reacting
   (i) at least one of an oil soluble sulfonic acid or alkaline earth sulfonate salt or mixtures thereof;
   (ii) at least one source of an alkaline earth metal; and
   (iii) at least one source of boron,
      in the presence of
   (iv) at least one hydrocarbon solvent;
   and
   (v) from 0 to less than 10 mole percent, relative to the source of boron, of an overbasing acid, other than the source of boron; and
(b) heating the reaction product of (a) to a temperature above the distillation temperature of (iv) to distill (iv) and water of reaction.

Hydrocarbon Solvent

The hydrocarbon solvent which may be used in the present process may be selected from the group consisting of n-pentane, n-hexane, cyclohexane, n-heptane, n-octane, isooctane, n-decane, benzene, toluene, xylene and mixtures thereof. Preferably, the hydrocarbon solvent is an aromatic solvent and is selected from the group of solvents consisting of xylene, benzene and toluene. The most preferred aromatic solvent is xylene.

Low Molecular Weight Alcohol

The low molecular weight alcohol must have a boiling point sufficiently low so that it may be easily distilled off after the reaction has occurred. Typically, the low molecular weight alcohol will have from about 1 to about 13 carbon atoms and a molecular weight no higher than about 200. In one embodiment, the low molecular weight alcohol is a low molecular weight monohydric alcohol. In a more preferred embodiment the low molecular weight monohydric alcohol which may be used in the present process may be selected from the group consisting of (C1-C13) alcohols and glycol monoethers and monoesters. Preferably, the low molecular weight alcohol is a monohydric alcohol selected from the group consisting of methanol, ethanol, propanol, isooctanol, cyclohexanol, cyclopentanol, isobutyl alcohol, benzyl alcohol, beta-phenyl-ethyl alcohol, 2-ethylhexanol, dodecanol, tridecanol, 2-methylcyclohexanol, monomethyl ether of ethylene glycol, monobutyl ether of ethylene glycol, sec-pentyl alcohol, and tert-butyl alcohol. The most preferred low molecular weight monohydric alcohol is methanol.

In a further embodiment, the low molecular weight alcohol is a polyhydric alcohol; in a preferred embodiment, the polyhydric alcohol is a dihydric alcohol, such as ethylene glycol.

Oil Soluble Sulfonic Acid or Alkaline Earth Metal Sulfonate Salt

In the present invention, either an oil soluble sulfonic acid or an oil soluble alkaline earth metal sulfonate salt is used in the process for preparing a borated sulfonate.

Sulfonic Acid

In one embodiment of the present invention, an oil soluble sulfonic acid may be used in the process for preparing a borated sulfonate. The sulfonic acid may be derived from sulfonating alkyl aromatics, especially alkylbenzene and alkyltoluene, such as linear alkylbenzene or alkyltoluene, branched alkylbenzene or alkyltoluene, or benzene or toluene having a polyalkenyl group (e.g., polyisobutene) with sulfuric acid, sulfur trioxide, chlorosulfonic acid or sulfamic acid. Sulfonic acid preparation is well known in the art.

In another embodiment of the present invention, the oil soluble sulfonic acid may be a polyalkylene sulfonic acid, especially a polyisobutene sulfonic acid. Sulfonic acids prepared from polyisobutenes are the subject of U.S. Pat. No. 6,410,491 which is incorporated herein by reference in its entirety and the sulfonate that is prepared from the sulfonic acid derived from polyisobutene is disclosed in U.S. Pat. No. 6,632,781 which is incorporated herein by reference.

Preferably, the sulfonic acid is obtained by the sulfonation of a mixture of primarily mono alkylbenzenes which are obtained from the alkylation of benzene by a mixture of heavy alpha linear olefins having from about 20 to about 24 carbon atoms.

In another embodiment the sulfonic acid is obtained by the sulfonation of a mixture of primarily mono alkyltoluene which are obtained from the alkylation of toluene by a mixture of heavy alpha linear olefins having from about 20 to about 24 carbon atoms.

Alkylbenzene may be derived from the alkylation of an aromatic compound wherein the alkylation is the reaction of a linear olefin which comprises at least 16 carbon atoms and an aromatic compound in the presence of a Lewis Acid. Preferably, the olefin is a normal alpha olefin that has from about 18 carbon atoms to about 26 carbon atoms. Alkylated aromatics, the process of which is well known in the art, may be derived from numerous processes including, but not limited to, the processes disclosed in US Patent Application Publication Nos. US 2005/0202954, US 2005/0203323, and US 2005/0203322.

Alkaline Earth Metal Sulfonate Salt

In another embodiment of the present invention, an alkaline earth metal sulfonate salt may be used in the process to prepare a borated sulfonate. The alkaline earth metal sulfonate salt may be derived from reacting a source of an alkaline earth metal with an alkylbenzene sulfonic acid. Preferably, when employing a linear alkylbenzene, the synthetic linear alkylbenzene sulfonic acid produced, therefrom, may be neutralized with a source of an alkaline earth metal. In a more preferred embodiment, the linear alkylbenzene sulfonic acid is neutralized with an alkaline earth metal hydroxide, such as, but not limited to, calcium hydroxide or magnesium hydroxide.

An important feature of this invention is that the alkaline earth metal sulfonate salt, if used, contains an amount of overbasing acid other than the source of boron, such that the product borated sulfonate contains from 0 to less than 10 mole percent, relative to the source of boron, of an overbasing acid, other than the source of boron. In a preferred embodiment the alkaline earth metal sulfonate salt does not contain an overbasing acid other than the source of boron. Preferably the alkaline earth metal sulfonate salt is a neutral alkaline earth metal sulfonate salt. Preferably the alkaline earth metal sulfonate salt has a TBN of from about 0 to about 50.

The sulfonate salts are those having a substantially oleophilic character and which are formed from organic materials. Organic sulfonates are well known materials in the lubricant and detergent arts. The sulfonate compound should contain on average from about 10 to about 40 carbon atoms, preferably from about 12 to about 36 carbon atoms and preferably from about 14 to about 32 carbon atoms.

Typically, the sulfonate is an alkyl aromatic sulfonate wherein the alkyl group is preferably derived from a normal alpha olefin. More preferred, the aromatic moiety is benzene or toluene and the alkyl group has from about 20 to about 24 carbon atoms. The most preferred sulfonate composition is a monosulfonated alkylated benzene.

Alkaline Earth Metal

A source of an alkaline earth metal is also reacted with the aforementioned compounds (i.e., at least one oil soluble sulfonic acid or alkaline earth metal sulfonate salt or mixtures thereof) in the presence of a mixture comprising a hydrocarbon solvent and a low molecular weight alcohol. Preferably, the alkaline earth metal used in the reaction of the present invention is an alkaline earth metal hydroxide or oxide. The most preferred source of alkaline earth metal is calcium hydroxide (lime).

Source of Boron

A source of boron is also reacted with the aforementioned compounds (i.e., at least one oil soluble sulfonic acid or alkaline earth metal sulfonate salt or mixtures thereof, and source of an alkaline earth metal) in the presence of a mixture comprising a hydrocarbon solvent and a low molecular weight alcohol. Boron sources include polymers of boric acid, boron anhydride, boron esters, and similar materials. The most preferred source of boron is orthoboric acid.

Overbasing Acid

The term "overbasing acid," as used herein, refers to an acid capable of providing an oil-soluble metal sulfonate with greater than a stoichiometric amount of metal to sulfonic acid. The most common overbasing acid is carbon dioxide; other overbasing acids include sulfur dioxide and sulfur trioxide. The acid itself may be part of the overbasing process, or alternatively a source of an overbasing acid such as ethylene carbonate may be used to introduce the overbasing acid.

Process and Diluent Oils

If the borated sulfonate is viscous, an inert liquid medium may be employed to reduce the viscosity. The inert liquid medium can also serve to disperse the product and to facilitate mixing of the ingredients. A preferred inert liquid medium is lubricating oil. As disclosed in Fuels and Lubricants Handbook, edited by George E. Totten, p. 199 (2003), a lubricating oil or "base fluid can be of mineral origin, synthetic chemical origin or biological origin. While mineral oil basestocks [are derived] from petroleum fractionation, synthetic basestocks are manufactured through transformations of petroleum-derived organic chemicals. Partly synthetic (semisynthetic) basestocks are compatible mixtures of mineral oil and synthetic basestocks." Basestocks of biological origin are derived from vegetable and animal oils.

The inert liquid medium may be omitted where, for example, the product is extruded. In such cases mechanical mixing replaces the need for a solvent.

Foam inhibitors and other processing aids may also be added.

Process—Neutralization of Sulfonic Acid

In a typical process of the present invention, hydrocarbon solvent is first premixed with a low molecular weight alcohol and a source of an alkaline earth metal. Generally this premixing is done near ambient temperatures, i.e. at about 15-40° C. Sulfonic acid is next added with agitation. Typically, sulfonic acid is added over a period of time wherein the temperature ranges from about 20° C. to about 40° C. Due to the heat of reaction, the temperature increases to from about 20° C. to about 55° C. The mixture is held for approximately 5 to 20 minutes at from about 40° C. to about 50° C. to ensure that the sulfonic acid is adequately neutralized by the source of alkaline earth metals to make a neutral alkaline earth metal sulfonate. If the alkaline earth sulfonate salt is used instead of the sulfonic acid this neutralization step is omitted.

The source of boron, such as boric acid, is added over a period of from about 5 minutes to about 20 minutes, while the temperature was maintained at from about 30° C. to about 50° C. The reaction is held at from about 30° C. to about 50° C. for from about 5 minutes to about 15 minutes. The reaction mixture may be held at an intermediate temperature of from about 70° C. to about 80° C. to reduce sediment in the final product. Methanol, water and xylene are then eliminated through separation methods that are well known in the art, such as distillation. Typically, a distillation step is used in which the above reaction mixture is heated to from about 125° C. to about 140° C. Typically, a diluent oil, such as 100N oil, will be employed and will be added to the mixture before all the hydrocarbon solvent is distilled. The un-reacted lime and boric acid are eliminated by conventional methods, such as centrifugation or filtration. The final product will have a typical base number of from about 10 to about 250 mg KOH/g.

When employed, the overbasing acid other than the source of boron may be introduced with the alkaline earth metal sulfonate salt, or introduced in situ during the reaction, or introduced after the reaction. In a preferred embodiment, the present process does not employ an overbasing acid other than the source of boron.

In a preferred embodiment of the present invention, the borated sulfonate is a borated calcium sulfonate.

The borated sulfonate of this process contains from 0 to less than 10 mole percent, relative to the source of boron, of an overbasing acid, other than the source of boron. In a preferred embodiment the process for preparing the alkaline earth metal borate sulfonate contains no overbasing acid, such as carbon dioxide, sulfur oxides etc., other than the source of boron. Additionally, although water may be a by-product of the reaction, in a preferred embodiment no water is added to the reaction mixture.

In a preferred embodiment of the present invention the weight ratio of low molecular weight alcohol to source of an alkaline earth metal is at least 0.2, preferably at least 0.35, more preferably at least 0.5. Most preferably, the weight ratio of low molecular weight alcohol to source of an alkaline earth metal is at least 0.65.

The boron content of the sulfonates employed in the present invention is from about 3.0 wt % to about 5.0 wt %. More preferred the amount of boron in the sulfonate is from about 3.5 wt % to about 4.5 wt %. Most preferred the amount of boron in the sulfonate is from about 3.7 wt % to about 4.3 wt %.

The water content of the borated sulfonate is typically less than 1.0% by weight. If the separation does not occur during processing, then during storage, the boron content may be diminished by having unacceptably high levels of water in the sulfonate product. Preferably, the water content of the sulfonate product is less than 1.0% by weight and more preferably less than 0.50% by weight.

Molybdenum-Containing Complex

Optionally, a molybdenum-containing compound is employed in the lubricating oil composition of the present invention for use in a heavy duty diesel engines.

The molybdenum-containing compound may be generally characterized as containing a molybdenum or molybdenum/sulfur complex of a basic nitrogen compound.

The molybdenum/nitrogen-containing complexes (additives) employed in the compositions and methods of this invention are well known in the art and are complexes of molybdic acid and an oil-soluble basic nitrogen-containing compound. Since their discovery, such complexes have been widely used as engine lubricating oil additive in automotive crankcase oils.

The molybdenum/nitrogen-containing complex is normally made with an organic solvent comprising a polar promoter during a complexation step and procedures for preparing such complexes are described, for example, in U.S. Pat. Nos. 4,402,840; 4,394,279; 4,370,246; 4,369,119; 4,285,822; 4,283,295; 4,265,773; 4,263,152; 4,261,843; 4,259,195; and 4,259,194 all of which are incorporated by reference in their entirety. As shown in these references, the molybdenum/nitrogen-containing complex can further be sulfurized.

The complexation step can be followed by a sulfurization step as disclosed in King et al., U.S. Pat. No. 4,263,152, which is herein incorporated by reference. Related King et al., U.S. Pat. No. 4,272,387, is also incorporated by reference.

The molybdenum compounds used to prepare the molybdenum, or molybdenum/sulfur compositions employed in this invention are acidic molybdenum compounds or salts of acidic molybdenum compounds. By acidic is meant that the molybdenum compounds will react with a basic nitrogen compound in which the basicity of the basic nitrogen compound can be determined by ASTM test D664 or the D2896 titration procedure. Typically, these molybdenum compounds are hexavalent and are represented by the following compositions: molybdic oxide, molybdic acid, ammonium molybdate, sodium molybdate, potassium molybdates and other alkaline metal molybdates and other molybdenum salts such as hydrogen salts, e.g., hydrogen sodium molybdate, $MoOCl_4$, $MoO_2Br_2$, $Mo_2O_3Cl_6$, molybdenum trioxide or similar acidic molybdenum compounds. Preferred acidic molybdenum compounds are molybdic oxide, molybdic acid, ammonium molybdate, and alkali metal molybdates. Particularly preferred is molybdic oxide.

The basic nitrogen compound used to prepare the molybdenum/sulfur compositions must contain basic nitrogen as measured by ASTM D664 test or D2896. It is preferably oil-soluble. The basic nitrogen compound is selected from the group consisting of succinimides, carboxylic acid amides, hydrocarbyl monoamines, hydrocarbon polyamines, Mannich bases, phosphoramides, thiophosphoramides, phosphonamides, dispersant viscosity index improvers, and mixtures thereof. These basic nitrogen-containing compounds are described below (keeping in mind the reservation that each must have at least one basic nitrogen). Any of the nitrogen-containing compositions may be post-treated with, e.g., boron, using procedures well known in the art so long as the compositions continue to contain basic nitrogen. These post-treatments are particularly applicable to succinimides and Mannich base compositions.

The succinimides and polysuccinimides that can be used to prepare the molybdenum/sulfur compositions described herein are disclosed in numerous references and are well known in the art. Certain fundamental types of succinimides and the related materials encompassed by the term of art "succinimide" are taught in U.S. Pat. Nos. 3,219,666; 3,172,892; and 3,272,746, the disclosures of which are hereby incorporated by reference. The term "succinimide" is understood in the art to include many of the amide, imide, and amidine species which may also be formed. The predominant product, however, is a succinimide and this term has been generally accepted as meaning the product of a reaction of an alkenyl substituted succinic acid or anhydride with a nitrogen-containing compound. Preferred succinimides, because of their commercial availability, are those succinimides prepared from a hydrocarbyl succinic anhydride, wherein the hydrocarbyl group contains from about 24 to about 350 carbon atoms, and an ethylene amine, said ethylene amines being especially characterized by ethylene diamine, diethylene triamine, triethylene tetramine, tetraethylene pentamine, and higher molecular weight polyethylene amines. Particularly preferred are those succinimides prepared from polyisobutenyl succinic anhydride of 70 to 128 carbon atoms and tetraethylene pentamine or higher molecular weight polyethylene amines or mixtures of polyethylene amines such that the average molecular weight of the mixture is about 205 Daltons thereof.

Also included within the term "succinimide" are the cooligomers of a hydrocarbyl succinic acid or anhydride and a polysecondary amine containing at least one tertiary amino nitrogen in addition to two or more secondary amino groups. Ordinarily, this composition has between 1,500 and 50,000 average molecular weight. A typical compound would be that prepared by reacting polyisobutenyl succinic anhydride and ethylene dipiperazine.

Carboxylic acid amide compounds are also suitable starting materials for preparing the molybdenum or molybdenum/sulfur compositions employed in this invention. Typical of such compounds are those disclosed in U.S. Pat. No. 3,405,064, the disclosure of which is hereby incorporated by reference. These compounds are ordinarily prepared by reacting a carboxylic acid or anhydride or ester thereof, having at least 12 to about 350 aliphatic carbon atoms in the principal aliphatic chain and, if desired, having sufficient pendant aliphatic groups to render the molecule oil soluble with an amine or a hydrocarbyl polyamine, such as an ethylene amine, to give a mono or polycarboxylic acid amide. Preferred are those amides prepared from (1) a carboxylic acid of the formula R2COOH, where R2 is C12-20 alkyl or a mixture of this acid with a polyisobutenyl carboxylic acid in which the polyisobutenyl group contains from 72 to 128 carbon atoms and (2) an ethylene amine, especially triethylene tetramine or tetraethylene pentamine or mixtures thereof.

Another class of compounds which are useful in this invention are hydrocarbyl monoamines and hydrocarbyl polyamines, preferably of the type disclosed in U.S. Pat. No. 3,574,576, the disclosure of which is hereby incorporated by reference. The hydrocarbyl group, which is preferably alkyl, or olefinic having one or two sites of unsaturation, usually contains from 9 to 350, preferably from 20 to 200 carbon atoms. Particularly preferred hydrocarbyl polyamines are those which are derived, e.g., by reacting polyisobutenyl chloride and a polyalkylene polyamine, such as an ethylene amine, e.g., ethylene diamine, diethylene triamine, tetraethylene pentamine, 2-aminoethylpiperazine, 1,3-propylene diamine, 1,2-propylenediamine, and the like.

Another class of compounds useful for supplying basic nitrogen are the Mannich base compounds. These compounds are prepared from a phenol or C9-200 alkylphenol, an aldehyde, such as formaldehyde or formaldehyde precursor such as paraformaldehyde, and an amine compound. The amine may be a mono or polyamine and typical compounds are prepared from an alkylamine, such as methylamine or an ethylene amine, such as, diethylene triamine, or tetraethylene pentamine, and the like. The phenolic material may be sulfurized and preferably is dodecylphenol or a C80-100 alkylphenol. Typical Mannich bases which can be used in this invention are disclosed in U.S. Pat. Nos. 4,157,309 and 3,649,229; 3,368,972; and 3,539,663, the disclosures of which are hereby incorporated by reference. The last referenced patent discloses Mannich bases prepared by reacting an alkylphenol having at least 50 carbon atoms, preferably 50 to 200 carbon atoms with formaldehyde and an alkylene polyamine HN(ANH)nH where A is a saturated divalent alkyl hydrocarbon of 2 to 6 carbon atoms and n is 1-10 and where the condensation product of said alkylene polyamine may be further reacted with urea or thiourea. The utility of these Mannich bases as starting materials for preparing lubricating oil additives can often be significantly improved by treating the Mannich base using conventional techniques to introduce boron into the compound.

Another class of compounds useful for preparing the molybdenum or molybdenum/sulfur compositions employed in this invention are the phosphoramides and phosphonamides such as those disclosed in U.S. Pat. Nos. 3,909,430 and 3,968,157, the disclosures of which are hereby incorporated by reference. These compounds may be prepared by forming a phosphorus compound having at least one P—N bond. They can be prepared, for example, by reacting phosphorus oxychloride with a hydrocarbyl diol in the presence of a monoamine or by reacting phosphorus oxychloride with a difunctional secondary amine and a mono-functional amine. Thiophosphoramides can be prepared by reacting an unsaturated hydrocarbon compound containing from 2 to 450 or more carbon atoms, such as polyethylene, polyisobutylene, polypropylene, ethylene, 1-hexene, 1,3-hexadiene, isobutylene, 4-methyl-1-pentene, and the like, with phosphorus pentasulfide and a nitrogen-containing compound as defined above, particularly an alkylamine, alkyldiamine, alkylpolyamine, or an alkyleneamine, such as ethylene diamine, diethylenetriamine, triethylenetetramine, tetraethylenepentamine, and the like.

Another class of nitrogen-containing compounds useful in preparing the molybdenum or molybdenum/sulfur compositions employed in this invention includes the so-called dispersant viscosity index improvers (VI improvers). These VI improvers are commonly prepared by functionalizing a hydrocarbon polymer, especially a polymer derived from ethylene and/or propylene, optionally containing additional units derived from one or more co-monomers such as alicyclic or aliphatic olefins or diolefins. The functionalization may be carried out by a variety of processes which introduce a reactive site or sites which usually has at least one oxygen atom on the polymer.

The polymer is then contacted with a nitrogen-containing source to introduce nitrogen-containing functional groups on the polymer backbone. Commonly used nitrogen sources include any basic nitrogen compound especially those nitrogen-containing compounds and compositions described herein. Preferred nitrogen sources are alkylene amines, such as ethylene amines, alkyl amines, and Mannich bases.

Preferred basic nitrogen compounds for use in this invention are succinimides, carboxylic acid amides, and Mannich bases. The preferred succinimide is prepared from a polyalkylene amine or mixtures thereof reacted with a polyisobutenyl succinic anhydride derived from the reaction of polyisobutylene with maleic anhydride as described in Harrison et al., U.S. Pat. No. 6,156,850.

Representative sulfur sources for preparing the molybdenum or molybdenum/sulfur compositions employed in this invention are sulfur, hydrogen sulfide, sulfur monochloride, sulfur dichloride, phosphorus pentasulfide, R2Sx where R is hydrocarbyl, preferably C1-40 alkyl, and x is at least 2, inorganic sulfides and polysulfides such as (NH4)2Sx, where x is at least 1, thioacetamide, thiourea, and mercaptans of the formula RSH where R is as defined above. Also useful as sulfurizing agents are traditional sulfur-containing antioxidants such as wax sulfides and polysulfides, sulfurized olefins, sulfurized carboxylic and esters and sulfurized ester-olefins, and sulfurized alkylphenols and the metal salts thereof.

The sulfurized fatty acid esters are prepared by reacting sulfur, sulfur monochloride, and/or sulfur dichloride with an unsaturated fatty acid ester under elevated temperatures. Typical esters include C1-C20 alkyl esters of C8-C24 unsaturated fatty acids, such as palmitoleic, oleic, ricinoleic, petroselinic, vaccenic, linoleic, linolenic, oleostearic, licanic, paranaric, tariric, gadoleic, arachidonic, cetoleic, etc. Particularly good results have been obtained with mixed unsaturated fatty acid esters, such as are obtained from animal fats and vegetable oils, such as tall oil, linseed oil, olive oil, castor oil, peanut oil, rape oil, fish oil, sperm oil, and so forth.

Exemplary fatty esters include lauryl tallate, methyl oleate, ethyl oleate, lauryl oleate, cetyl oleate, cetyl linoleate, lauryl ricinoleate, oleyl linoleate, oleyl stearate, and alkyl glycerides.

Cross-sulfurized ester olefins, such as a sulfurized mixture of C10-C25 olefins with fatty acid esters of C10-C25 fatty acids and C1-C25 alkyl or alkenyl alcohols, wherein the fatty acid and/or the alcohol is unsaturated may also be used.

Sulfurized olefins are prepared by the reaction of the C3-C6 olefin or a low-molecular-weight polyolefin derived therefrom with a sulfur-containing compound such as sulfur, sulfur monochloride, and/or sulfur dichloride.

Also useful are the aromatic and alkyl sulfides, such as dibenzyl sulfide, dixylyl sulfide, dicetyl sulfide, diparaffin wax sulfide and polysulfide, cracked wax-olefin sulfides and so forth. They can be prepared by treating the starting material, e.g., olefinically unsaturated compounds, with sulfur, sulfur monochloride, and sulfur dichloride. Particularly preferred are the paraffin wax thiomers described in U.S. Pat. No. 2,346,156.

Sulfurized alkyl phenols and the metal salts thereof include compounds such as sulfurized dodecylphenol and the calcium salts thereof. The alkyl group ordinarily contains from 9-300 carbon atoms. The metal salt may be preferably, a Group I or Group II salt, especially sodium, calcium, magnesium, or barium.

Preferred sulfur sources are sulfur, hydrogen sulfide, phosphorus pentasulfide, R2Sx where R is hydrocarbyl, preferably C1-C10 alkyl, and x is at least 3, mercaptans wherein R is C1-C10 alkyl, inorganic sulfides and polysulfides, thioacetamide, and thiourea. Most preferred sulfur sources are sulfur, hydrogen sulfide, phosphorus pentasulfide, and inorganic sulfides and polysulfides.

The polar promoter used in the preparation of the molybdenum or molybdenum/sulfur compositions employed in this invention is one which facilitates the interaction between the molybdenum compound and the basic nitrogen compound. A wide variety of such promoters are well known to those skilled in the art. Typical promoters are 1,3-propanediol, 1,4-butane-diol, diethylene glycol, butyl cellosolve, propylene glycol, 1,4-butyleneglycol, methyl carbitol, ethanolamine, diethanolamine, N-methyl-diethanol-amine, dimethyl formamide, N-methyl acetamide, dimethyl acetamide, methanol, ethylene glycol, dimethyl sulfoxide, hexamethyl phosphoramide, tetrahydrofuran and water. Preferred are water and ethylene glycol. Particularly preferred is water.

While ordinarily the polar promoter is separately added to the reaction mixture, it may also be present, particularly in the case of water, as a component of non-anhydrous starting materials or as waters of hydration in the acidic molybdenum compound, such as (NH4)6Mo7O24.4 H2O. Water may also be added as ammonium hydroxide.

In a particularly preferred embodiment, low color intensity molybdenum/nitrogen-containing complexes used in this invention are prepared from a mixture of the molybdenum compound and a polar promoter with a basic nitrogen-containing compound, e.g., an alkenyl succnimide, with or without diluent. The diluent is used, if necessary, to provide a suitable viscosity for easy stirring. Typical diluents are lubricating oil and liquid compounds containing only carbon and hydrogen. If desired, ammonium hydroxide may also be added to the reaction mixture to provide a solution of ammonium molybdate. In this improved molybdenum-containing compound reaction, a basic nitrogen compound (e.g., a succinimide), neutral oil, and water are charged to the reactor. The reactor is agitated and heated at a temperature less than or equal to about 120° C., preferably from about 70° C. to about 90° C. Molybdic oxide is then charged to the reactor and the temperature is maintained at a temperature less than or equal to about 120° C., preferably at about 70° C. to about 90° C., until the molybdenum is sufficiently reacted. The reaction time for this step is typically in the range of from about 2 to about 30 hours and preferably from about 2 to about 10 hours.

Typically excess water is removed from the reaction mixture. Removal methods include but are not limited to vacuum distillation or nitrogen stripping while maintaining the temperature of the reactor at a temperature less than or equal to about 120° C., preferably between about 70° C. to about 90° C. The temperature during the stripping process is held at a temperature less than or equal to about 120° C. to maintain the low color intensity of the molybdenum-containing compound. It is ordinarily carried out under reduced pressure. The pressure may be reduced incrementally to avoid problems with foaming. After the desired pressure is reached, the stripping step is typically carried out for a period of about 0.5 to about 5 hours and preferably from about 0.5 to about 2 hours.

Optionally, the reaction mixture may be further reacted with a sulfur source as defined above, at a suitable pressure and temperature not to exceed 120° C. The sulfurization step is typically carried out for a period of from about 0.5 to about 5 hours and preferably from about 0.5 to about 2 hours. In some cases, removal of the polar promoter from the reaction mixture may be desirable prior to completion of reaction with the sulfur source.

In the reaction mixture, the ratio of molybdenum compound to basic nitrogen compound is not critical; however, as the amount of molybdenum with respect to basic nitrogen increases, the filtration of the product becomes more difficult. Since the molybdenum component probably oligomerizes, it is advantageous to add as much molybdenum as can easily be maintained in the composition. Usually, the reaction mixture will have charged to it from 0.01 to 2.00 atoms of molybdenum per basic nitrogen atom. Preferably from 0.4 to 1.0, and most preferably from 0.4 to 0.7, atoms of molybdenum per atom of basic nitrogen is added to the reaction mixture.

When employed, the sulfur source is usually charged to the reaction mixture in such a ratio to provide up to 1 atom of sulfur per atom of molybdenum. A preferred ratio is 0.1 atom of sulfur per atom of molybdenum.

The polar promoter, which is preferably water, is ordinarily present in the ratio of 0.5 to 25 moles of promoter per mole of molybdenum. Preferably from 1.0 to 4 moles of the promoter is present per mole of molybdenum.

The color of the molybdenum-containing compound was measured using a Perkin-Elmer Lambda 18 UV-Visible Double-Beam Spectrophotometer. In this test, the visible spectra of molybdenum compositions are recorded at a constant concentration in an isooctane solvent. The spectra represent the absorbance intensity plotted versus the wavelength in nanometers. The spectra extend from the visible region into the near infrared region of the electromagnetic radiation (350 nanometers to 900 nanometers). In this test, the highly colored samples showed increasingly higher absorbance at increasingly higher wavelengths at a constant molybdenum concentration.

The preparation of the sample for color measurement comprises diluting the molybdenum-containing compound with isooctane to achieve a constant molybdenum concentration of 0.00025 g molybdenum per gram of the molybdenum-containing compound/isooctane mixture. Prior to sample measurement the spectrophotometer is referenced by scanning air versus air. The UV visible spectrum from 350 nanometers to 900 nanometers is obtained using a one centimeter pathlength quartz cell versus an air reference. The spectra are offset corrected by setting the 867 nanometer absorbance to zero. Then the absorbance of the sample is determined at 350 nanometers wavelength.

The Lubricating Oil Composition

Typically, the lubricating oil composition of the present invention comprises a major amount of an oil of lubricating viscosity and a minor amount of at least the borated sulfonate, no more than 0.12 wt % P and no more than 1.25 wt % sulfated ash. The lubricating oil composition containing the additives employed in this invention may be prepared by admixing, by conventional techniques, the appropriate amount of the borated sulfonate with a major amount of an oil of lubricating viscosity.

Preferably the concentration of borated sulfonate in the lubricating oil composition is no more than 3.0 wt %, on an actives basis, based on the total weight of the lubricating oil composition. More preferred, the concentration of borated sulfonate in the lubricating oil composition is no more than 1.0 wt %, on an actives basis, based on the total weight of the lubricating oil composition. Most preferred, the concentration of borated sulfonate in the lubricating oil composition is no more than 0.5 wt %, on an actives basis, based on the total weight of the lubricating oil composition.

The lubricating oil composition has limitations on the concentration of the other additives that may be added in the lubricating oil composition. If the molybdenum containing compound is employed, the amount of the molybdenum containing compound in the lubricating oil composition is from about 0.05 to 15% (preferably 0.2 to 1%) based on the total weight of the lubricating oil composition wherein the amount of molybdenum in said complex is sufficient to provide from about 10 to 5000 ppm molybdenum in said composition. More preferred, the amount of molybdenum is from about 40 ppm to about 1000 ppm. Most preferred the amount of molybdenum is from about 50 ppm to about 500 ppm.

The amount of phosphorus in the composition comprises no more than 0.12 wt %; more preferred the amount of phosphorus is no more than 0.10 wt %; even more preferred the amount of phosphorus is no more than 0.08 wt %; most preferred the amount of phosphorus is no more than 0.06 wt %; and even most preferred the composition is substantially free of phosphorus. Substantially free within the scope of this invention means that the lubricating oil composition contains no more than 0.02 wt % phosphorus.

The lubricating oil composition comprises at least 50 parts per million of boron.

The composition may also comprise a mixture of borated and non-borated metal free dispersants. Preferably, the borated and the non-borated ashless dispersants are polyisobutylene succinimide.

The amount of sulfated ash in the lubricating oil composition comprises no more than 1.25 percent by weight. More preferred the amount of sulfated ash in the composition comprises no more than 1.0 percent by weight. Even more preferred the amount of sulfated ash in the composition comprises no more than 0.8 percent by weight. Most preferred the amount of sulfated ash comprises no more than 0.5 percent by weight.

The amount of sulfur in the lubricating oil composition preferably comprises no more than 0.5 percent by weight. More preferred the amount of sulfur comprises no more than 0.4 percent by weight. Most preferred the amount of sulfur comprises no more than 0.3 percent by weight.

The lubricating oil composition may also comprise a phenolic antioxidant in an amount of at least 0.2 percent by weight. More preferred the amount of phenolic antioxidant in the composition is at least 0.4 percent by weight. Most preferred the amount of phenolic antioxidant in the composition is at least 0.8 percent by weight.

The lubricating oil composition may also comprise an aminic antioxidant. When employed, the aminic antioxidant is present in an amount of at least 0.1 percent by weight.

Preferably, the lubricating oil composition may also comprise at least one of a sulfonate, in addition to the borated sulfonate, phenate or carboyxlate detergent.

Preferably, the sulfonate, phenate or carboxylate detergent is a low overbased detergent and comprises no more than 3.0 percent by weight of the lubricating oil composition. More preferred, the detergent comprises no more than 1.0 percent by weight. Most preferred, the detergent comprises no more than 0.5 percent by weight. In a preferred embodiment, the detergent is a CO2 overbased detergent derived from more than 10 mole percent, relative to the source of boron, of an overbasing acid, other than the source of boron. In a more preferred embodiment, the detergent is a $CO_2$ overbased detergent containing no boron.

The base oil employed may be any one of a variety of oils of lubricating viscosity. The base oil of lubricating viscosity used in such compositions may be mineral oils or synthetic oils. A base oil having a viscosity of at least 2.5 cSt at 40° C. and a pour point below 20° C., preferably at or below 0° C., is desirable. The base oils may be derived from synthetic or natural sources. Mineral oils for use as the base oil in this invention include, but are not limited to, paraffinic, naphthenic and other oils that are ordinarily used in lubricating oil compositions. Synthetic oils include, but are not limited to, both hydrocarbon synthetic oils and synthetic esters and mixtures thereof having the desired viscosity. Hydrocarbon synthetic oils may include, but are not limited to, oils prepared from the polymerization of ethylene, polyalphaolefin or PAO oils, or oils prepared from hydrocarbon synthesis procedures using carbon monoxide and hydrogen gases such as in a Fisher-Tropsch process. Useful synthetic hydrocarbon oils include liquid polymers of alpha olefins having the proper viscosity. Especially useful are the hydrogenated liquid oligomers of C6 to C12 olefins such as 1-decene trimer. Likewise, alkyl benzenes of proper viscosity, such as didodecyl benzene, can be used. Useful synthetic esters include the esters of monocarboxylic acids and polycarboxylic acids, as well as mono-hydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful.

Thus, the base oil can be a refined paraffin type base oil, a refined naphthenic base oil, or a synthetic hydrocarbon or non-hydrocarbon oil of lubricating viscosity. The base oil can also be a mixture of mineral and synthetic oils, such as the following: Group II; Group III; a mixture of Group II and Group III; a mixture of Group II and synthetic oils; Group IV or mixtures thereof. Preferably, the base oil mixture is a Group II base oil having a viscosity index of greater than 95 and a NOACK volatility of no more than 13%. Also preferred is a gas-to-liquid base oil.

Additionally, other additives well known in lubricating oil compositions may be added to the anti-wear additive composition of the present invention to complete a finished oil.

Other Additives

The following additive components are examples of some of the components that can be favorably employed in the present invention. These examples of additives are provided to illustrate the present invention, but they are not intended to limit it:

1. Metal Detergents

Carboxylates, sulfurized or unsulfurized alkyl or alkenyl phenates, alkyl or alkenyl aromatic sulfonates, borated sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multiacid, and chemical and physical mixtures thereof.

2. Anti-Oxidants

Anti-oxidants reduce the tendency of mineral oils to deteriorate in service which deterioration is evidenced by the products of oxidation such as sludge and varnish-like deposits on the metal surfaces and by an increase in viscosity. Examples of anti-oxidants useful in the present invention include, but are not limited to, phenol type (phenolic) oxidation inhibitors, such as 4,4'-methylene-bis(2,6-di-tert-butylphenol), 4,4'-bis(2,6-di-tert-butylphenol), 4,4'-bis(2-methyl-6-tert-butylphenol), 2,2'-methylene-bis(4-methyl-6-tert-butylphenol), 4,4'-butylidene-bis(3-methyl-6-tert-butylphenol), 4,4'-isopropylidene-bis(2,6-di-tert-butylphenol), 2,2'-methylene-bis(4-methyl-6-nonylphenol), 2,2'-isobutylidene-bis(4,6-dimethylphenol), 2,2'-5-methylene-bis(4-methyl-6-cyclohexylphenol), 2,6-di-tert-butyl-4-methylphenol, 2,6-di-tert-butyl-4-ethylphenol, 2,4-dimethyl-6-tert-butyl-phenol, 2,6-di-tert-1-dimethylamino-p-cresol, 2,6-di-tert-4-(N,N'-dimethylaminomethylphenol), 4,4'-thiobis(2-methyl-6-tert-butylphenol), 2,2'-thiobis(4-methyl-6-tert-butylphenol), bis(3-methyl-4-hydroxy-5-tert-10-butylbenzyl)-sulfide, and bis(3,5-di-tert-butyl-4-hydroxybenzyl). Other types of anti-oxidants that are useful in the present invention include, but are not limited to aminic antioxidants such as the following: diphenylamine-type oxidation inhibitors include, but are not limited to, alkylated diphenylamine, phenyl-alpha-naphthylamine, and alkylated-alpha-naphthylamine. Other types of oxidation inhibitors include metal dithiocarbamate (e.g., zinc dithiocarbamate), and 15-methylenebis(dibutyldithiocarbamate).

3. Anti-Wear Agents

As their name implies, these agents reduce wear of moving metallic parts. Examples of such agents include, but are not limited to, phosphates and thiophosphates and salts thereof, carbamates, esters, and molybdenum complexes.

4. Rust Inhibitors (Anti-Rust Agents)

a) Nonionic polyoxyethylene surface active agents: polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol mono-oleate, and polyethylene glycol mono-oleate.

b) Other compounds: stearic acid and other fatty acids, dicarboxylic acids, metal soaps, fatty acid amine salts, metal salts of heavy sulfonic acid, partial carboxylic acid ester of polyhydric alcohol, and phosphoric ester.

5. Demulsifiers

Addition product of alkylphenol and ethylene oxide, polyoxyethylene alkyl ether, and polyoxyethylene sorbitan ester.

6. Extreme Pressure Anti-Wear Agents (EP/AW Agents)

Sulfurized olefins, zinc dialky-1-dithiophosphate (primary alkyl, secondary alkyl, and aryl type), diphenyl sulfide, methyl trich lorostea rate, chlorinated naphthalene, fluoroalkylpolysiloxane, lead naphthenate, neutralized or partially neutralized phosphates, dithiophosphates, and sulfur-free phosphates.

7. Friction Modifiers

Fatty alcohol, fatty acid (stearic acid, isostearic acid, oleic acid and other fatty acids or salts thereof), amine, borated ester, other esters, phosphates, other phosphites besides tri- and di-hydrocarbyl phosphites, and phosphonates.

8. Multifunctional Additives

Sulfurized oxymolybdenum dithiocarbamate, sulfurized oxymolybdenum organo phosphorodithioate, oxymolybdenum monoglyceride, oxymolybdenum diethylate amide, amine-molybdenum complex compound, and sulfur-containing molybdenum complex compound.

9. Viscosity Index Improvers

Polymethacrylate type polymers, ethylene-propylene copolymers, styrene-isoprene copolymers, hydrated styrene-isoprene copolymers, polyisobutylene, and dispersant type viscosity index improvers.

10. Pour Point Depressants

Polymethyl methacrylate.

11. Foam Inhibitors

Alkyl methacrylate polymers and dimethyl silicone polymers.

12. Metal Deactivators

Disalicylidene propylenediamine, triazole derivatives, mercaptobenzothiazoles, thiadiazole derivatives, and mercaptobenzimidazoles.

13. Dispersants

Alkenyl succinimides, alkenyl succinimides modified with other organic compounds, alkenyl succinimides modified by post-treatment with ethylene carbonate or boric acid, esters of polyalcohols and polyisobutenyl succinic anhydride, phenate-salicylates and their post-treated analogs, alkali metal or mixed alkali metal, alkaline earth metal borates, dispersions of hydrated alkali metal borates, dispersions of alkaline-earth metal borates, polyamide ashless dispersants and the like or mixtures of such dispersants.

Method of Making Lubricating Oil Composition

The lubricating oil composition of the present invention comprises the following:

a major amount of an oil of lubricating viscosity; and a borated alkaline earth metal sulfonate detergent, described herein, wherein the lubricating oil composition contains no more than 0.12 wt % phosphorus and no more than 1.25 wt % sulfated ash.

The lubricating oil composition is prepared as follows:
(A) a major amount of an oil of lubricating viscosity is mixed with
(B) a borated alkaline earth metal sulfonate detergent prepared by a process comprising
   (a) reacting
      (i) at least one of an oil soluble sulfonic acid or alkaline earth sulfonate salt or mixtures thereof;
      (ii) at least one source of an alkaline earth metal; and
      (iii) at least one source of boron,
         in the presence of
      (iv) at least one hydrocarbon solvent;
      and
      (v) from 0 to less than 10 mole percent, relative to the source of boron, of an overbasing acid, other than the source of boron; and
   (b) heating the reaction product of (a) to a temperature above the distillation temperature of (iv) to distill (iv) and water of reaction.

This composition is prepared by mixing the appropriate amounts of each of the components until a homogenous composition is obtained.

Preferably, from about 0.01 wt % as alkaline earth metal to about 0.36 wt % as alkaline earth metal of the borated alkaline earth metal sulfonate is added to the lubricating oil composition. More preferred, from about 0.02 wt % as alkaline earth metal to about 0.24 wt % as alkaline earth metal of borated alkaline earth metal sulfonate is added to the lubricating oil composition. Most preferred, from about 0.04 wt % as alkaline earth metal to about 0.12 wt % as alkaline earth metal of borated alkaline earth metal sulfonate is added to the lubricating oil composition.

Optionally, a molybdenum-containing compound may also be added to the lubricating oil composition. Preferably, from about 0.05 wt % to about 15 wt % of the molybdenum-containing compound is added to the lubricating oil composition. More preferred, from about 0.1 wt % to about 7.0 wt % of the molybdenum-containing compound is added to the lubricating oil composition. Most preferred, from about 0.2 wt % to about 1.0 wt % of the molybdenum-containing compound is added to the lubricating oil composition.

Optionally, other additives, which are described herein, may be added to the lubricating oil composition. Such additives include, but are not limited to, the following: detergents, such as phenates, carboxylates, or sulfonates; boron and non-boron containing dispersants; phenolic and aminic antioxidants; foam inhibitors; and viscosity index improvers.

The borated alkaline earth metal sulfonate may also be top treated to a fully formulated lubricating oil.

Preferably the concentration of borated sulfonate in the lubricating oil composition is no more than 3.0 wt %, on an actives basis, based on the total weight of the lubricating oil composition. More preferred, the concentration of borated sulfonate in the lubricating oil composition is no more than 1.0 wt %, on an actives basis, based on the total weight of the lubricating oil composition. Most preferred, the concentration of borated sulfonate in the lubricating oil composition is no more than 0.5 wt %, on an actives basis, based on the total weight of the lubricating oil composition.

Method of Use of the Present Invention

The present invention is used to decrease the wear of the metal of at least two mating metal surfaces in relative motion. Specifically, the lubricating oil of the present invention contacts metal components in a heavy duty diesel engine to reduce wear and lubricates contiguous metal components thereby decreasing wear of the mating metal surfaces.

The invention is further illustrated by the following examples, which set forth particularly advantageous method embodiments. While the examples are provided to illustrate the present invention, they are not intended to limit it.

EXAMPLES

Example A

Sulfonic Acid Preparation

In a typical preparation benzene is alkylated with a mixture of C20-C24 heavy alpha linear olefins thereby producing a mixture of monoalkylbenzenes. Sulfur is burned to produce $SO_2$ which is converted to $SO_3$ using $V_2O_5$ catalyst in a fixed bed reactor.

Sulfonic acid is obtained by the sulfonation of a mixture of monoalkylbenzenes with $SO_3$ at a charge mole ratio of $SO_3$/alkylate of 0.85 to 1.00. The alkylate at 55-60° C. is contacted with a $SO_3$/air mixture in a falling film sulfonator.

Example B

Borated Sulfonate Preparation 936.0 grams xylene were added to a 4 Liter glass reactor at room temperature 198 grams of lime were added to the reactor while mixing. During a 20 minute period, 600 grams of sulfonic acid as prepared in Example A were added to the glass reactor. Due to the heat of reaction the reactor temperature rose from 24° C. to 45° C. After the hold of 15 minutes the reactor was cooled to 17° C. 294 grams of boric acid were added to the reactor during a five minute period. The reactor was held for 15 minutes to ensure adequate mixing and reaction of the boric acid. 247 grams of methanol were then added to the reactor at 17° C. over a 15 minute time period. The temperature rose to 31° C. due to the heat of reaction.

The reactor was heated to 71° C. over a 40 minute period. The reactor was then heated to 77° over a 55 minute period, then to 93° C. over a 40 minute period, then to 127° C., over a 60 minute period. 319 grams of Exxon 100N was added to the reactor. The crude sediment was measured as 1.6 Vol % by centrifugation. The reaction mixture was heated to 170° over a 30 minute period to remove the bulk of the xylene solvent. At the same time, the pressure was reduced to 1.0 psia. The reaction mixture was held for five minutes. The reaction was ended and the crude sediment measured as 3.2 Vol %.

Examples 1-4 were evaluated using the Mack T-12 Engine Test, which involves the use of a Mack E-TECH V-MAC III diesel engine with Exhaust Gas Recirculation (EGR). A warm-up and a 1-hour break-in are followed by a two phase test consisting of running an engine for 100 hours at 1800 revolutions/minute and for 200 hours at 1200 revolutions/minute, both at constant speed and load conditions. This test method was developed to evaluate the wear and corrosion performance of engine oils in turbocharged and intercooled four-cycle diesel engines equipped with EGR and running on ultra-low sulfur diesel fuel. At the end of the test, the lubricating oil may be evaluated for Pb content. The recommended upper limit of lead in a lubricating oil composition is about 20 ppm.

Example 1

Invention

A fully formulated lubricating oil composition was prepared which included (a) a mixture of borated and non-borated bissuccinimide dispersants, (b) a mixture of antioxidants, (c) Neutral Calcium Sulfonate Detergent, (d) a mixture of inhibitors, (e) Viscosity Index Improver, and (f) Group II Base Oil etc. and the following additives:

| | |
|---|---|
| Carbonated Sulfurized Ca Phenate | 0.95 wt % |
| Borated Sulfonate Detergent[1] | 0.08 wt % as Ca |
| Zinc Dithiophosphate | 1.06 wt % |
| Pour point depressant | 0.5 wt % |

The chemical properties of the oil were as follows:

| | |
|---|---|
| Phosphorus | 0.115 wt % |
| Sulfated Ash | 0.98 wt % |

Example 2

Comparative—Absence of Borated Sulfonate

A fully formulated lubricating oil composition was prepared which included (a) a mixture of borated and non-borated bissuccinimide dispersants, (b) a mixture of antioxidants, (c) Neutral Calcium Sulfonate Detergent, (d) a mixture of inhibitors, (e) Viscosity Index Improver, and (f) Group II Base Oil etc. and the following additives:

| | |
|---|---|
| Carbonated Sulfurized Ca Phenate | 0.208 wt % as Ca |
| Zinc Dithiophosphate[1] | 1.06 wt % |

[1]As prepared according to Example B.

The chemical properties of the oil were as follows:

| | |
|---|---|
| Phosphorus | 0.115 wt % |
| Sulfated Ash | 1.05 wt % |

Example 3

Comparative—Absence of Borated Sulfonate

A fully formulated lubricating oil composition was prepared which included (a) a mixture of borated and non-borated bissuccinimide dispersants, (b) a mixture of antioxidants, (c) Neutral Calcium Sulfonate Detergent, (d) a mixture of inhibitors, (e) Viscosity Index Improver, and (f) Group II Base Oil etc. and the following additives:

| | |
|---|---|
| Carbonated Sulfurized Ca Phenate | 0.289 wt % as Ca |
| Zinc Dialkyl Dithiophosphate | 0.144 wt % as Zn |

The chemical properties of the oil were as follows:

| | |
|---|---|
| Phosphorus | 0.14 wt % |
| Sulfated Ash | 1.5 wt % |

Example 4

Invention

A fully formulated lubricating oil composition was prepared which included (a) a mixture of borated and non-borated bissuccinimide dispersants, (b) a mixture of antioxidants, (c) Neutral Calcium Sulfonate Detergent, (d) a mixture of inhibitors, (e) Viscosity Index Improver, and (f) Group II Base Oil etc. and the following additives:

| | |
|---|---|
| Dispersant | 4.0 wt % |
| Overbased Phenate | 0.95 wt % |
| Borated Sulfonate Detergent[2] | 0.080 wt % as Ca |
| Zinc Dithiophosphate | 1.06 wt % |

[2]As prepared according to Example B.

The chemical properties of the oil were as follows:

| | |
|---|---|
| Phosphorus | 0.11 wt % |
| Sulfated Ash | 1.00 wt % |

The following table, Table 1, depicts the concentrations of lead in the oil at the end of the Mack T-12 engine test.

TABLE 1

| Example | Concentration of Pb (ppm) |
|---|---|
| 1 | 12 |
| 2 | 50 |
| 3 | 28 |
| 4 | 7 |

As illustrated by the Pb content of Examples 1 and 4, the lubricating oil composition of the invention comprising a borated sulfonate exhibits a low lead content measured at the end of the test. Specifically, the lubricating oil composition of Example 1 has a lead content of 12 mg and the lubricating oil composition of Example 4 has a lead content of 7 mg which were measured at the end of the Mack T-12 test run. This result indicates that low wear and corrosion in the engine occurred. By contrast, lubricating oil compositions that do not contain a borated sulfonate concentration have a lead content of 50 mg (Example 2) and 28 mg (Example 3) measured at the end of the Mack T-12 test. Although Examples 2 and 3 do not contain borated sulfonate, Example 3 has a lower lead content that was measured at the end of the test. This lower lead content is attributed to the fact that the lubricating oil in Example 3 has a high phosphorus content compared to the lubricating oil used in Example 2. The high phosphorus content may be attributed to the greater amount of zinc dithiophosphate (ZDDP) in the lubricating oil composition which, as is well known in the art, may be used to reduce wear in a heavy duty diesel engine. However, as the examples of the present invention show (see Example 1 and 4), wear may be reduced without the high level of ZDDP (see Example 3), which contains phosphorus contaminants. The addition of a borated sulfonate to an oil of lubricating viscosity decreases wear and corrosion while maintaining the amount of phosphorus in the lubricating oil composition to no more than 0.12 wt %.

Other formulations comprising a borated sulfonate in an oil of lubricating viscosity were prepared. These formulations were evaluated for the content of lead and copper in the fully formulated oil using the High Temperature Corrosion Bench Test, ASTM D6594—Standard Test Method for Evaluation of Corrosiveness of Diesel Engine Oil at 135° C. This test is conducted using four metal specimens of copper, lead, tin and phosphor bronze which are immersed in a measured amount of engine oil. The oil, at an elevated temperature, is blown with air for a period of time. When the test is completed, the specimen and the stressed oil are examined to detect corrosion and corrosion products (i.e., lead), respectively. Preferably, the upper limit of lead in the lubricating oil composition is no more than 100 ppm.

The following examples are of fully formulated oils that were evaluated for their lead content using ASTM D6594.

Example 5

Comparative

A fully formulated lubricating oil composition was prepared using the following additives:

| Non-Borated Bissuccinimide | 3.2 wt % |
| Carbonated Calcium Sulfonate | 0.87 wt % |
| Zinc Dithiophosphate | 1.06 wt % |
| Aminic Antioxidant | 0.40 wt % |
| Molybdenum Succinimide Complex | 2.70 wt % |
| Foam Inhibitor | 5 ppm |
| Pour Point Depressant | 0.30 wt % |
| Viscosity Index Improver | 4.0 wt % |
| Group II Base Oil | Balance |

Example 6

Comparative

A fully formulated lubricating oil composition was prepared using the following additives:

| Non-Borated Bissuccinimide | 3.2 wt % |
| Carbonated Calcium Sulfonate | 0.87 wt % |
| Zinc Dithiophosphate | 1.06 wt % |
| Aminic Antioxidant | 0.40 wt % |
| Foam Inhibitor | 5 ppm |
| Pourpoint Depressant | 0.30 wt % |
| Viscosity Index Improver | 4.0 wt % |
| Group II Base Oil | Balance |

Example 7

Invention

A fully formulated lubricating oil composition was prepared using the following additives:

| Non-Borated Bissuccinimide | 3.2 wt % |
| Borated Sulfonate Detergent[3] | 0.22 wt % as Ca |
| Zinc Dithiophosphate | 1.06 wt % |
| Aminic Antioxidant | 0.40 wt % |
| Molybdenum Succinimide Complex | 2.70 wt % |
| Foam Inhibitor | 5 ppm |
| Pour Point Depressant | 0.30 wt % |
| Viscosity Index Improver | 4.0 wt % |
| Group II Base Oil | Balance |

[3]As prepared according to Example B.

Example 8

Invention

A fully formulated lubricating oil composition was prepared using the following additives:

| Non-Borated Bissuccinimide | 3.2 wt % |
| Borated Sulfonate Detergent[4] | 0.22 wt % as Ca |
| Zinc Dithiophosphate | 1.06 wt % |
| Aminic Antioxidant | 0.40 wt % |
| Foam Inhibitor | 5 ppm |
| Pourpoint Depressant | 0.30 wt % |
| Viscosity Index Improver | 4.0 wt % |
| Group II Base Oil | Balance |

[4]As prepared according to Example B.

The following table, Table 2, depicts the concentration of lead in a fully formulated oil as determined using the High Temperature Corrosion Bench Test.

TABLE 2

| Example | Concentration of Pb (ppm) |
| --- | --- |
| 5 | 179.2 |
| 6 | 71.4 |
| 7 | 8.5 |
| 8 | 3.2 |

The above examples show that Comparative Examples 5 and 6 have a greater amount of lead in the oil when evaluated using ASTM D-6594. This greater amount of lead may be attributed to the fact that neither Example 5 nor Example 6 has borated sulfonate in its formulation. However, Examples 7 and 8, which have borated sulfonate in their formulations, have a lead concentration of 8.5 ppm and 3.2 ppm which was measured at the end of the test. As shown in the examples, addition of borated sulfonate reduces the amount of lead in a heavy duty diesel engine oil lubricant which, in turn, decreases the amount of corrosion in the engine.

An additional feature of the present invention is that the use of the borated sulfonates described herein in lubricating oil compositions may result in improved pour point as compared to other detergents. The following table, Table 3, summarizes the pour point characteristics of lubricating oils containing detergent systems, both containing and not containing borated sulfonates. All lubricating oils contained, in addition to the detergent system, the identical baseline formulation which contained conventional quantities of dispersant, antioxidant, zinc dithiophosphate, and VI improver. No pour point depressant was included in the compositions. All oils were formulated to approximately 0.8 wt % sulfated ash, and 0.05 wt % P.

TABLE 3

| Example | Detergent System | Detergent Concentration (wt % as Ca) | ASTM D97 Pour point (° C.) |
|---|---|---|---|
| 9 | Borated Sulfonate C | 0.192 | −39 |
| 10 | Borated Sulfonate D | 0.192 | −36 |
| 11 | Borated Sulfonate C | 0.176 | −39 |
|  | Non-carbonated Ca Sulfonate | 0.020 |  |
| 12 | Non-carbonated Ca sulfonate | 0.036 | −33 |
|  | Carbonated Ca Sulfonate | 0.168 |  |
| 13 | Borated Sulfonate C | 0.056 | −30 |
|  | Carbonated Sulfurized Ca Phenate | 0.128 |  |
| 14 | Carbonated Sulfurized Ca Phenate | 0.204 | −21 |
| 15 | Carbonated Salicylate | 0.120 | −30 |
|  | Borated Sulfonate C | 0.080 |  |
| 16 | Carbonated Salicylate | 0.204 | −30 |

Examples 9 and 10 of the invention show that borated sulfonates, when used alone, result in excellent lubricating oil pour points. A comparison of example 11 of the invention with example 12 not of the invention shows an improved pour point for the detergent system employing borated sulfonate, as does a comparison of example 13 with example 14. A comparison of example 15 of the invention with example 16 not of the invention shows that the lubricating oil composition of the invention is at least no worse than a similar lubricating oil composition not of the invention.

It is understood that although modifications and variations of the invention can be made without departing from the spirit and scope thereof, only such limitations should be imposed as are indicated in the appended claims.

What is claimed is:

1. A lubricating oil composition comprising:
(A) a major amount of an oil of lubricating viscosity; and
(B) a borated alkaline earth metal sulfonate detergent prepared by a process comprising (a) reacting (i) at least one of an oil soluble sulfonic acid, an alkaline earth sulfonate salt, or a mixture thereof; (ii) at least one source of alkaline earth metal; (iii) at least one source of boron, in the presence of (iv) at least one hydrocarbon solvent; and (v) from 0 to less than 10 mole percent, relative to the source of boron, of an overbasing acid, other than the source of boron; and (b) heating the reaction product of (a) to a temperature that is above the distillation temperature of (iv) to distill (iv) and the water generated in the reaction; wherein the lubricating oil composition comprises no more than 0.12 wt % phosphorus.

2. The lubricating oil composition according to claim 1 wherein step (a) takes place in the further presence of at least one low molecular weight alcohol.

3. The lubricating oil composition according to claim 2 wherein the low molecular weight alcohol is a monohydric alcohol.

4. The lubricating oil composition according to claim 1, wherein the borated alkaline earth metal sulfonate detergent is a borated calcium sulfonate salt.

5. The lubricating oil composition according to claim 4, wherein the borated calcium sulfonate salt has a Total Base Number (TBN) of from about 10 to about 500.

6. The lubricating oil composition according to claim 5, wherein the borated calcium sulfonate salt has a TBN of from about 10 to about 400.

7. The lubricating oil composition according to claim 6, wherein the borated calcium sulfonate salt has a TBN of from about 100 to about 300.

8. The lubricating oil composition according to claim 7, wherein the borated calcium sulfonate salt has a TBN of from about 150 to about 250.

9. The lubricating oil composition according to claim 1, further comprising a molybdenum-containing complex.

10. The lubricating oil composition according to claim 9, wherein the molybdenum-containing complex is a molybdenum succinimide complex.

11. The lubricating oil composition according to claim 8, wherein the concentration of molybdenum is from about 40 parts per million (ppm) to about 1000 ppm, based on the total weight of the lubricating oil composition.

12. The lubricating oil composition according to claim 11, wherein the concentration of molybdenum is from about 50 ppm to about 500 ppm, based on the total weight of lubricating oil composition.

13. The lubricating oil composition according to claim 1, wherein the amount of phosphorous is no more than about 0.10 wt %.

14. The lubricating oil composition according to claim 13, wherein the amount of phosphorous is no more than 0.08 wt %.

15. The lubricating oil composition according to claim 14, wherein the amount of phosphorous is no more than 0.06 wt %.

16. The lubricating oil composition according to claim 15, which is substantially free of phosphorous.

17. The lubricating oil composition according to claim 1, comprising at least 50 ppm of boron.

18. The lubricating oil composition according to claim 1, further comprising a mixture of a boron-containing dispersant and a non-boron-containing dispersant.

19. The lubricating oil composition according to claim 18, comprising from about 50 ppm to about 2000 ppm boron.

20. The lubricating oil composition according to claim 15, wherein the amount of sulfated ash is no more than 1.0 wt %.

21. The lubricating oil composition according to claim 20, wherein the amount of sulfated ash is no more than 0.8 wt %.

22. The lubricating oil composition according to claim 21, wherein the amount of sulfated ash is no more than 0.5 wt %.

23. The lubricating oil composition according to claim 1, having a sulfur concentration of no more than 0.5 wt %.

24. The lubricating oil composition according to claim 23, having a sulfur concentration of no more than 0.4 wt.

25. The lubricating oil composition according to claim 24, having a sulfur concentration of no more than 0.3 wt %.

26. The lubricating oil composition according to claim 1, further comprising a phenolic antioxidant in an amount greater than 0.2 wt %.

27. The lubricating oil composition according to claim 26, wherein the phenolic antioxidant is in an amount greater than 0.8 wt %.

28. The lubricating oil composition according to claim 1, further comprising one or more detergents selected from the group consisting of phenate detergents, additional sulfonate detergents, carboxylate detergents, and mixtures thereof.

29. The lubricating oil composition according to claim 28, wherein at least one of the one or more further detergents is a magnesium sulfonate detergent.

30. The lubricating oil composition according to claim 28, comprising a mixture of a calcium phenate detergent and a magnesium sulfonate detergent.

31. The lubricating oil composition according to claim 28, wherein the one or more further detergents is a $CO_2$ overbased detergent derived from more than 10 mole percent, relative to the source of boron, of an overbasing acid, other than the source of boron.

32. The lubricating oil composition according to claim 31, comprising a detergent that is a $CO_2$ overbased detergent containing no boron.

33. The lubricating oil composition according to claim 31, wherein the TBN of the $CO_2$ overbased detergent is from about 50 to about 500 TBN.

34. The lubricating oil composition according to claim 1, wherein the concentration of the borated sulfonate is no more than 3.0 wt %, on an actives basis, based on the total weight of the lubricating oil composition.

35. The lubricating oil composition according to claim 33, wherein the concentration of the $CO_2$ overbased detergent is no more than 1.0 wt %, on an actives basis, based on the total weight of the lubricating oil composition.

36. The lubricating oil composition according to claim 34, wherein the concentration of the borated sulfonate is no more than 0.5 wt %, on an active basis, based on the total weight of the lubricating oil composition.

37. A method of making a lubricating oil composition comprising: mixing (A) a major amount of an oil of lubricating viscosity; and (B) a borated alkaline earth metal sulfonate detergent prepared by a process comprising (a) reacting (i) at least one of an oil soluble sulfonic acid, an alkaline earth sulfonate salt, or a mixtures thereof; (ii) at least one source of an alkaline earth metal; (iii) at least one source of boron, in the presence of (iv) at least one hydrocarbon solvent; and (v) from 0 to less than 10 mole percent, relative to the source of boron, of an overbasing acid, other than the source of boron; and (b) heating the reaction product of (a) to a temperature that is above the distillation temperature of (iv) to distill (iv) and water generated in the reaction; wherein the lubricating oil composition comprises no more than 0.12 wt % phosphorus.

38. A method of reducing corrosion in an internal combustion engine which comprises operating the engine with the lubricating oil composition of claim 1.

39. A method of reducing wear in an internal combustion engine which comprises operating the engine with the lubricating oil composition of claim 1.

40. The lubricating oil composition according to claim 1, further comprising a non-borated succinimide.

41. The lubricating oil composition according to claim 1, wherein the oil soluble soluble sulfonic acid, an alkaline earth sulfonate salt, or a mixture thereof is derived from sulfonating an alkyl aromatic compound.

42. The lubricating oil composition according to claim 41, wherein the alkyl aromatic compound is an alkylbenzene or an alkyltoluene.

43. The lubricating oil composition according to claim 42, wherein the alkylbenzene is a linear alkylbenzene.

44. The lubricating oil composition according to claim 42, wherein the alkyltoluene is a linear alkyltoluene.

45. The lubricating oil composition according to claim 43, wherein the linear alkyl group of the linear alkylbenzene comprises at least about 16 carbon atoms.

46. The lubricating oil composition according to claim 44, wherein the linear alkyl group of the linear alkyltoluene comprises at least about 16 carbon atoms.

47. The lubricating oil composition according to claim 43, wherein the linear alkyl group of the linear alkylbenzene comprises about 18 to about 26 carbon atoms.

48. The lubricating oil composition according to claim 43, wherein the linear alkyl group of the linear alkylbenzene comprises about 20 to about 24 carbon atoms.

49. The lubricating oil composition according to claim 44, wherein the linear alkyl group of the linear alkyltoluene comprises about 20 to about 24 carbon atoms.

50. The lubricating oil composition according to claim 42, wherein the alkylbenzene is a branched alkylbenzene.

51. The lubricating oil composition according to claim 42, wherein the alkyltoluene is a branched alkyltoluene.

52. The lubricating oil composition according to claim 42, wherein the alkyl group of the alkylbenzene is derived from a polyalkene.

53. The lubricating oil composition according to claim 42, wherein the alkyl group of the alkyltoluene is derived from a polyalkene.

54. The lubricating oil composition according to claim 1, wherein the lubricating oil composition comprises no more than 1.25 wt. % sulfated ash.

\* \* \* \* \*